(12) United States Patent
Lawless

(10) Patent No.: US 6,650,276 B2
(45) Date of Patent: Nov. 18, 2003

(54) RADAR APPARATUS AND METHOD FOR DETECTING SMALL SLOW MOVING TARGETS

(76) Inventor: James C. Lawless, 126 Main St., Lebanon, NJ (US) 08833

(*) Notice: Subject to any disclaimer, the term of this patent is extended or adjusted under 35 U.S.C. 154(b) by 0 days.

(21) Appl. No.: 10/090,898

(22) Filed: Mar. 5, 2002

(65) Prior Publication Data

US 2003/0052811 A1 Mar. 20, 2003

Related U.S. Application Data

(60) Provisional application No. 60/305,318, filed on Jul. 13, 2001.

(51) Int. Cl.[7] ............................. G01S 13/56; G01S 13/00
(52) U.S. Cl. ............................. 342/28; 342/27; 342/22; 342/159; 342/175; 342/195; 342/196
(58) Field of Search ............................. 180/167, 168, 180/169; 342/20, 21, 22, 27, 28, 70, 71, 72, 89, 90–105, 118, 175, 192–197, 127–145, 159

(56) References Cited

U.S. PATENT DOCUMENTS

| | | | | |
|---|---|---|---|---|
| 3,576,565 A | * | 4/1971 | Schulz | 342/118 |
| 4,095,666 A | * | 6/1978 | Baba et al. | 180/169 |
| 4,695,752 A | * | 9/1987 | Ross et al. | 342/21 |
| 4,818,997 A | * | 4/1989 | Holmes | 342/20 |
| 4,949,088 A | * | 8/1990 | Ryan et al. | 342/20 |
| 5,883,591 A | * | 3/1999 | McEwan | 342/22 |

* cited by examiner

Primary Examiner—Bernarr E. Gregory
(74) Attorney, Agent, or Firm—Moser, Patterson & Sheridan, LLP

(57) ABSTRACT

Radar method and apparatus for detecting small, slow moving targets in the presence of high background clutter that includes a balanced bridge structure to achieve a null balance with the target and background clutter. Radar return signals from background objects as well as the targets are viewed by the radar as a composite single signature return. The invention uses a phase shifter to achieve a null balance even though the background clutter consists of many components at varying distances from the radar.

18 Claims, 8 Drawing Sheets

RADAR APPARATUS AND METHOD FOR DETECTING SMALL SLOW MOVING TARGETS

CROSS-REFERENCE TO RELATED APPLICATIONS

This application claims benefit of U.S. provisional patent application Ser. No. 60/305,318, filed Jul. 13, 2001, which is herein incorporated by reference.

BACKGROUND OF THE INVENTION

1. Field of the Invention

The present invention generally relates to radar systems and, more particularly, to a radar apparatus and method suitable for detecting small, slow moving targets in the presence of high background clutter.

2. Description of the Related Art

In the past, radar systems have been used to detect and track relatively large, fast moving targets by the military and others. These targets have been typically artillery projectiles, rockets, people, automobiles, aircraft, etc. Detecting very small, slow moving targets at short distances, in the presence of high background clutter, has not been a high priority.

There have been a number of attempts to design a radar system to detect small, slow moving targets. These radar systems have not been very successful for a number of reasons. First, using a pulse radar to detect and track small, slow moving targets has been plagued with difficulties. The radar cross section of the target is very small, and any background clutter tends to blind the radar. The pulse radar has a minimum range, primarily determined by the transmitter pulse width. A typical minimum range of this type of radar is of the order of many hundreds of feet. At this range, identifying small targets is virtually impossible. Tracking a swarm of flying insects is nearly impossible due to the very small radar cross section. The target is not homogenous, and a good radar lock on a small undulating mass is very difficult.

Secondly, several attempts have been made to use a Continuous Wave (CW) Doppler Radar to detect small slowly moving targets. A doppler radar is sensitive to velocity, and a slow moving target generates a doppler frequency of the order of a few cycles per second. Insects normally move slowly over a few tens of millimeters during a measurement period. For reliable detection the target must generate a number of Doppler cycles by moving in a straight line towards or away from the radar antenna. An insect moving many wavelengths in a straight line in such a direction is unlikely.

Therefore, there is a need in the art for a radar apparatus and method that can detect small, slow moving targets in the presence of high background clutter.

SUMMARY OF THE INVENTION

The disadvantages associated with the prior art are overcome by a radar apparatus and method for detecting small, slow moving targets wherein the radar return signals from background objects as well as the target are viewed by the radar as a composite single signature return. The apparatus comprises a balanced bridge structure that can achieve a null balance even though the background clutter consists of many components at varying distances from the radar. The target sensitivity of the radar depends upon how deep a null of the clutter signal the radar can achieve. A very small change in the target position changes the composite clutter signature and causes the null to shift. The change in the null is then more easily detected.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention is an implementation of a continuous wave (CW) microwave radar system that can detect targets that are very small. These targets move slowly and randomly over short distances in the presence of high background clutter. There are many uses for such a radar system including, but not limited to, the detection of very small insect targets such as termites, carpenter ants, weevils, and the like in structures, in materials such as grain, and in other environments.

Figure 1:
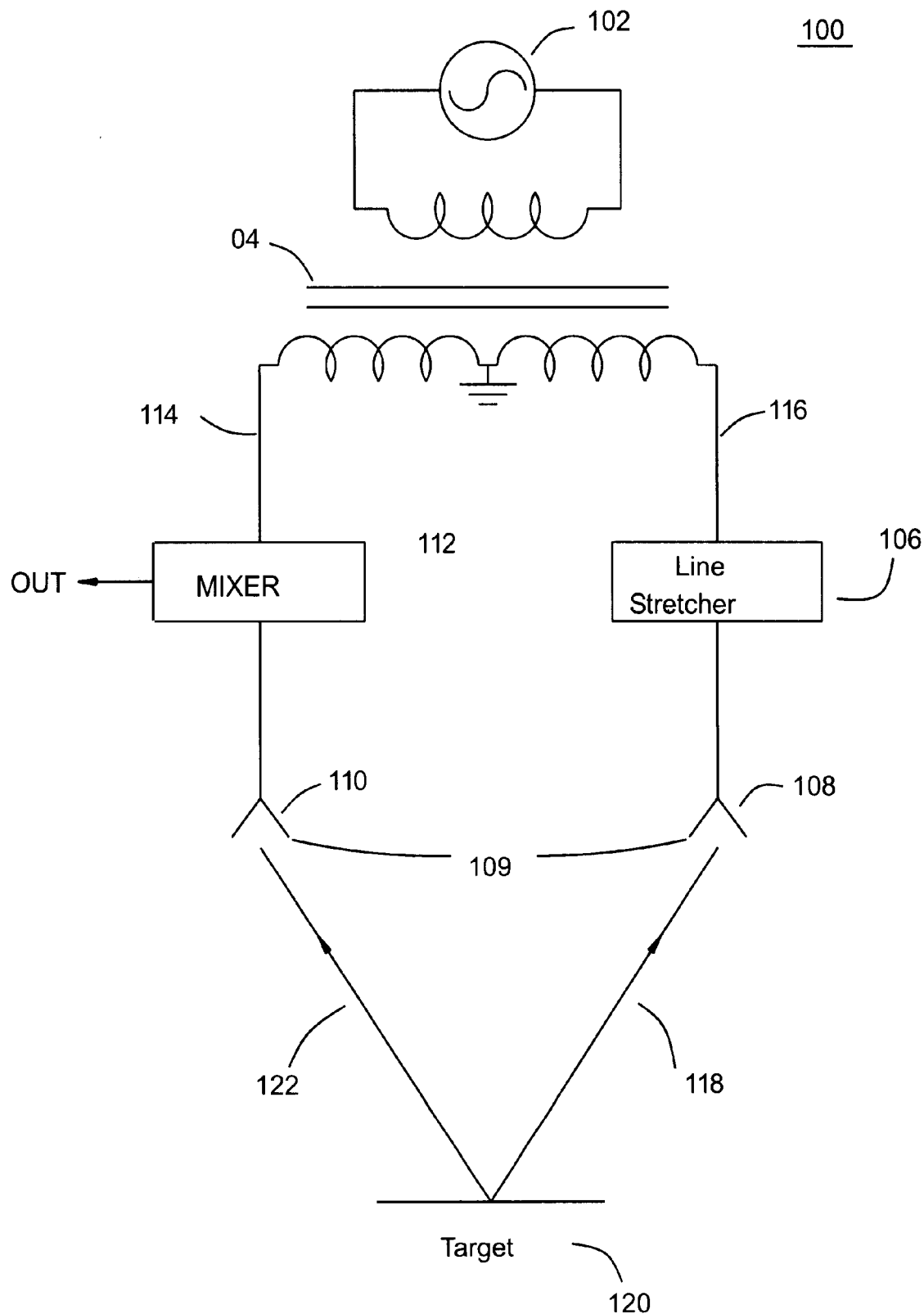
FIG. 1 depicts a block diagram of one embodiment of a balanced bridge radar system.

FIG. 1 depicts a block diagram of one embodiment of a balanced bridge radar system 100 in accordance with the present invention. The radar system 100 comprises a microwave energy generator 102, a transformer 104, a line stretcher 106, a transmitter antenna 108, a receiving antenna 110, and a mixer 112. Transmitter antenna 108 and receiving antenna 110 collectively comprise an antenna system 109.

In operation, the energy from the microwave generator 102 is split into two paths 114 and 116 by the transformer 104. The transformer 104 can also be a directional coupler, or other suitable means as are known in the art. A small amount of energy flows in path 114 to supply power into the local oscillator port of the mixer 112. The mixer 112 comprises a direct current (dc) coupled microwave mixer. The input port of the mixer 112 is connected to the receiving antenna 110. The output port of the mixer 112 is the dc coupled output signal representing the difference between the signals at the local oscillator and input ports.

The majority of the power from the microwave generator 102 flows in path 116 to the input port of the line stretcher 106. The line stretcher 106 comprises a microwave phase shifter that can adjust the delay of a microwave signal from zero to a minimum of ¼ wavelength at the radar's operating frequency. The line stretcher 106 produces a phase adjustment in the signal at the input port. The output port of the line stretcher 106 is connected to the transmitter antenna 108. The microwave energy exits the transmitter antenna 108 and proceeds along path 118 to a target 120. Some of the energy is reflected from the target 120 along path 122 and is picked up by the receiving antenna 110. As described above, the energy is coupled to the input port of the mixer 112.

Figure 2:
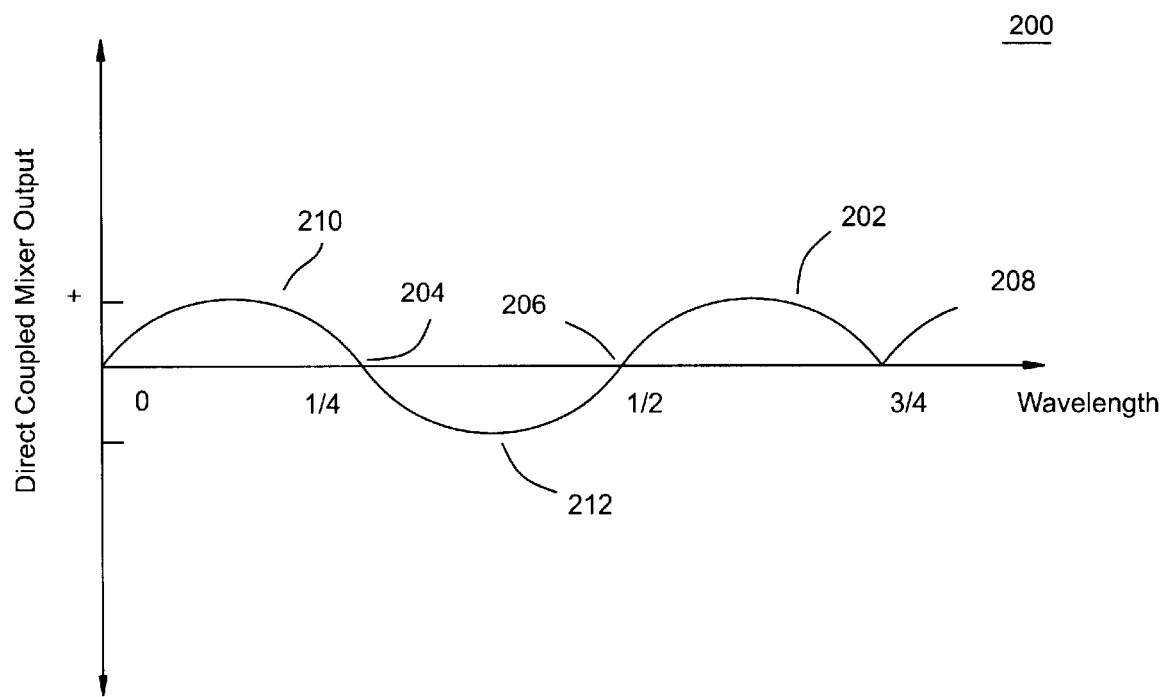
FIG. 2 shows a graph of the output of the balanced bridge radar system versus the line stretcher adjustment for a fixed target position.

FIG. 2 shows a graph 200 of the output of the balanced bridge radar system 100 versus the phase adjustment for a fixed target position. Since the present embodiment of the system 100 is dc coupled, the output voltage from the mixer 112 output port (out) is a dc signal 202 that varies as a sinusoid from zero through a plus or minus value and back to zero as the line stretcher 106 is adjusted through each quarter wavelength. For an arbitrary target position, the line stretcher 106 can be adjusted so the output of the mixer 112 is nulled to zero at the ¼, ½, and ¾ wavelength points, designated 204, 206, 208, respectively. With the signal 202 nulled to zero, the sensitivity of a measuring system amplifier (not shown), which could be connected to the output port of the mixer 112, can be increased to a high level without saturating. The increase in gain of such an amplifier compensates for the very small return from the target. Using this principle, a very small target displacement in path 118 to path 122 is easily measured.

Figure 3:
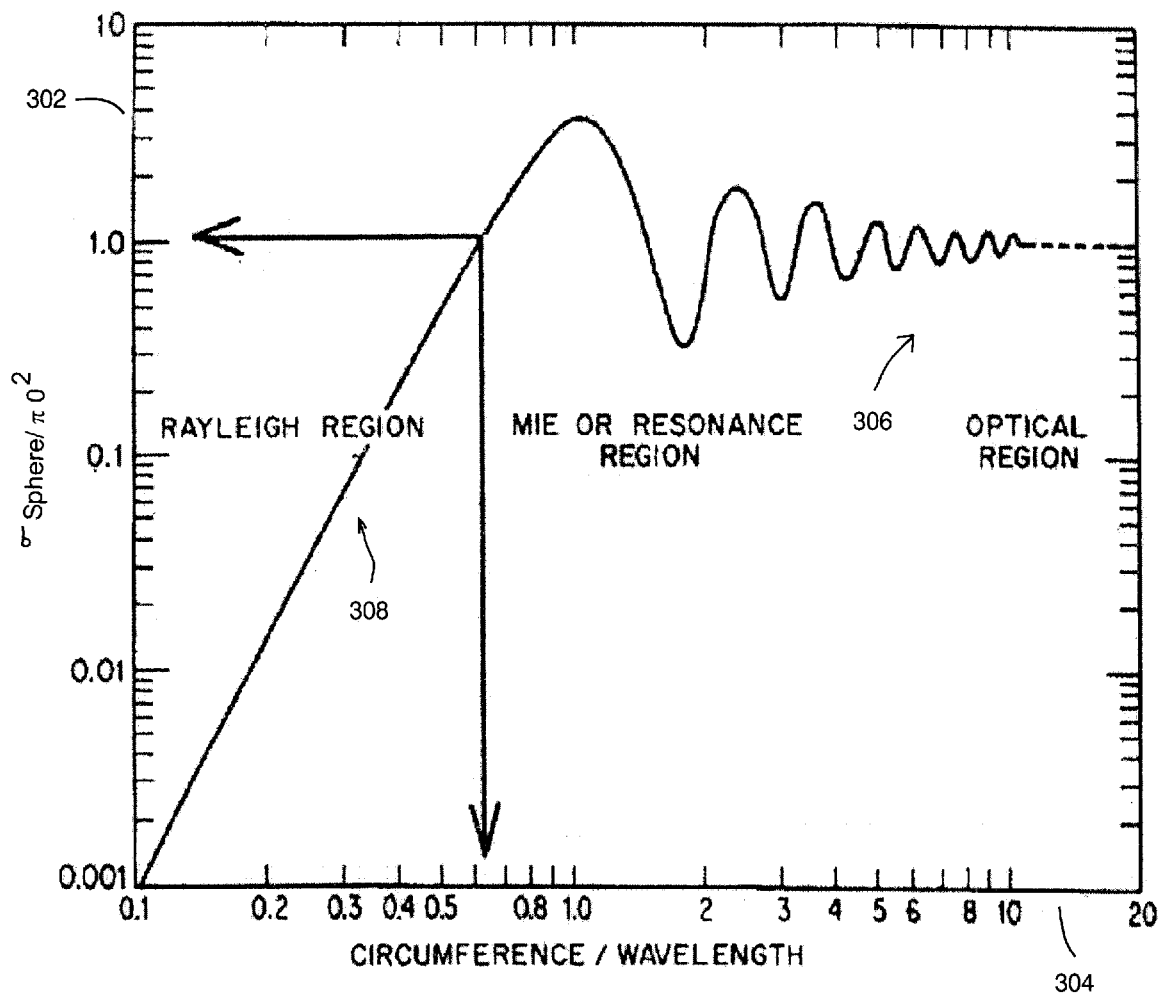
FIG. 3 shows a graph of the radar cross section versus wavelength for a spherical reference target.

FIG. 3 shows the radar cross section 302 versus wavelength 304 for a spherical reference target. Most radar systems operate in the Optical Region 306, where the radar sensitivity is independent of wavelength. When the target 120 is very small compared to the wavelength, the radar operates in the Rayleigh region 308. In this region the return signal decreases rapidly with decreasing target size. Scaling the drawing shows that the radar return signal decreases by nearly three orders of magnitude (over 1000) for each six to one reduction in target size. Using the balanced bridge radar system 100 and nulling out the large background clutter signal allows the system gain to be increased to the point that a small target can be observed.

Clutter is the radar cross-section return of the background not associated with the target of interest. One of the major advantages of a CW radar is that it discriminates against the stationary clutter signal while showing the moving target. The effect of the clutter is to reduce the radar's sensitivity by the ratio of the radar cross-section of the target divided by the radar cross section the background clutter.

A small target, such as an insect moving along the floor results in a large background clutter (floor, ground, etc.) associated with the target signal. Using the line stretcher 106 to null out the target and clutter combination allows the mixer 112 output signal to be greatly amplified. This makes it possible to view the target's position movement in the presence of background clutter without saturating the radar's detection system.

The antenna system 109 used with this type radar can operate either in the near or far field. The distance in front of the antenna 109 where it changes from near to far field is approximately as follows: $R = 2 \times D^2/\lambda$, where R is the distance from the antenna 109, D is the antenna aperture, and $\lambda$ is the wavelength of the transmitted signal.

Figure 4:
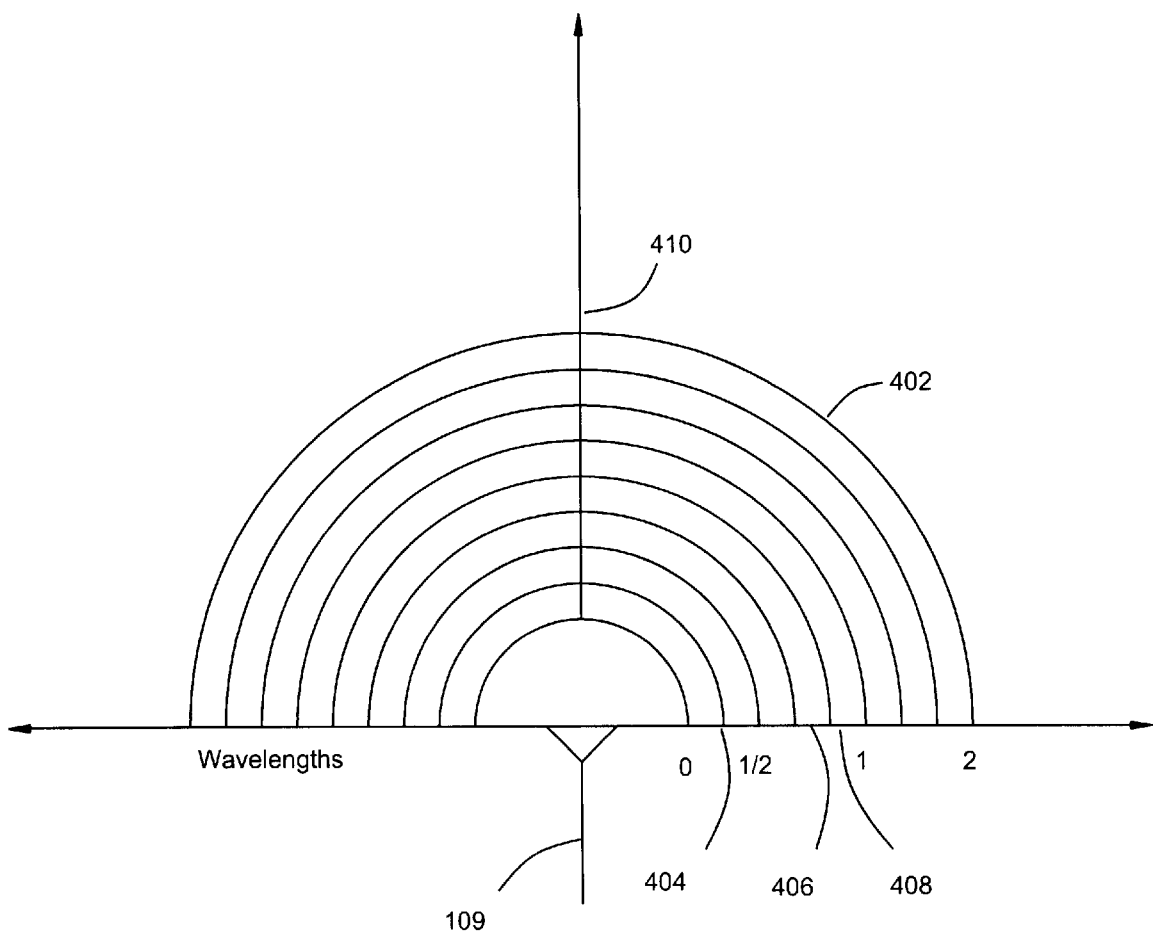
FIG. 4 shows the far field antenna pattern of the balanced bridge radar system.

The far field antenna pattern is shown in FIG. 4, and its extent corresponds to the equation $R > 2 \times D^2/\lambda$. The concentric circles 402 show the ¼, ½, and ¾ null semicircles of revolution (designated 404, 406, 408, respectively) about line 410. A null point is passed for each semicircle that the target 120 moves through. The target 120 can move either axially or laterally with respect to the antenna 109 to pass into or out of a semicircle null and be detected.

Figure 5:
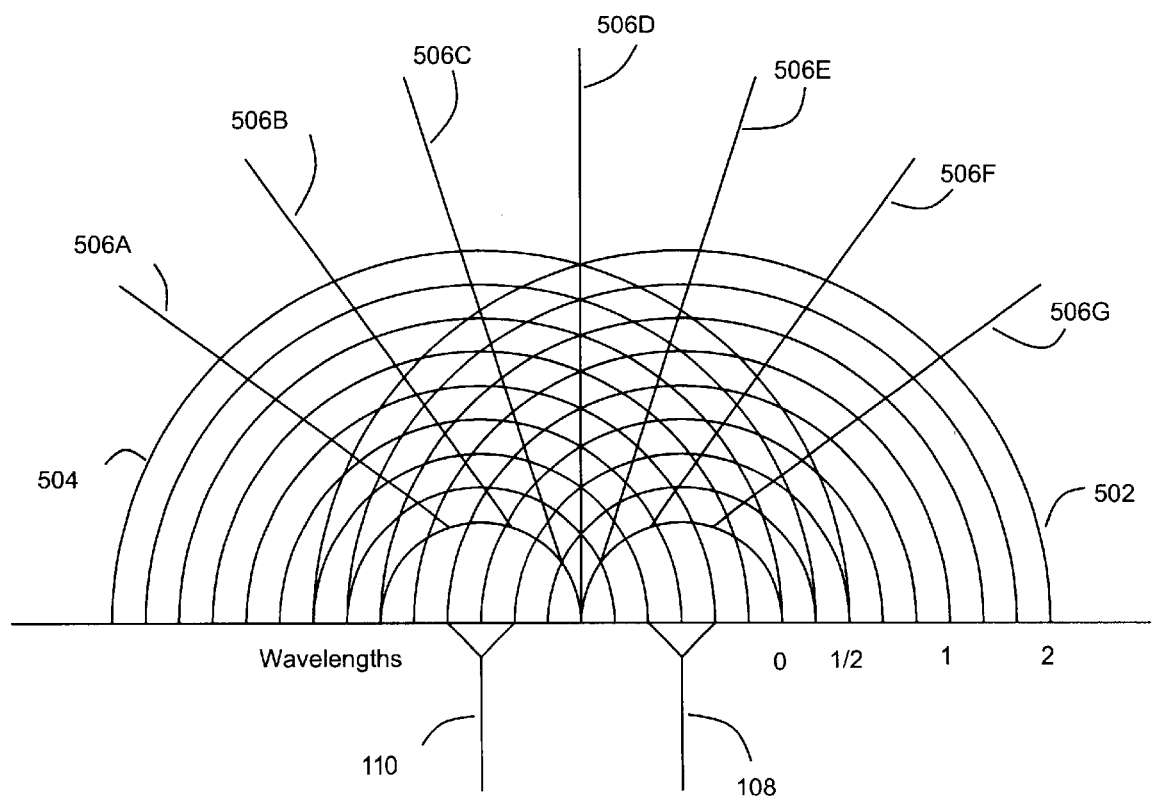
FIG. 5 shows the near field antenna pattern of the balanced bridge radar system.

The near field radar antenna system is shown in FIG. 5, and its extent corresponds to the equation $R < 2 \times D^2/\lambda$. Here the transmitter and receiver antennas 108 and 110 are shown at one or more wavelengths apart. In the present embodiment, the two antennas 108 and 110 separated by two wavelengths. Those skilled in the art will understand that other spacing is also possible that will have different lateral sensitivities.

Operating in the near field has the following advantages: (A) The transmitter cross leakage to the receiver antenna is reduced by up to 60 dB reducing saturation problems and increasing the system's sensitivity; and (B) An interference pattern is set up such as shown in FIG. 5. The intersection of two sets of concentric circles 502 and 504 shows where the radar system can achieve a system null. The axial lines 506A through 506G are drawn through the null points. In the near field, the radar is very sensitive to axial and lateral target movement and the lateral distance sensitivity is greater. Again the distance between semicircles is ¼ wavelength. The near field can vary from two to thirty inches, depending upon the design of the antenna system 109. The position of the null semicircles can be moved towards or away from the radar antennas 108 and 110 by changing the phase adjustment of the line stretcher 106.

The basic radar implementation described above shows the radar operating with a continuous wave unmodulated carrier. With this type of system the output information from the mixer 112 is a direct current signal that can be observed on a slow moving dc type voltmeter. This is the simplest implementation of the balanced bridge radar system 100. The radar system 100, however, is sensitive to any conducting medium that changes with time. Fluorescent lamps, for instant, have a mercury vapor the length of the lamp with a conduction cycles that goes on and off 120 times a second. The fluorescent lamp presents a large interfering target to the radar system 100. There are many other sources of interfering signals to a radar system with frequencies in the vicinity of the sixty hertz power frequency.

The ultimate sensitivity of the radar depends upon the phase noise of the microwave source. For a typical solid state microwave oscillator, the phase noise is of the order of minus eighty decibels below the carrier level (−80 dBc). The phase noise decreases as the radar receiver operating point is moved away from the carrier frequency. Therefore, the further the receiver is operated from the carrier frequency (zero frequency), the lower the phase noise and the more sensitive the radar.

Figure 6:
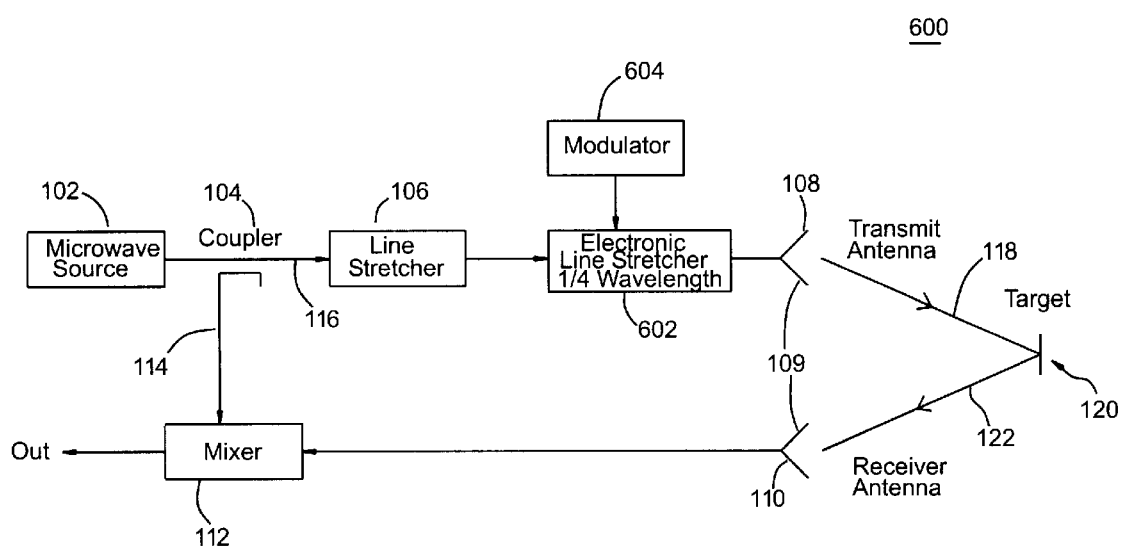
FIG. 6 depicts a block diagram of another embodiment of the balanced bridge radar system.

FIG. 6 shows a balanced bridge radar 600 with the addition of an electronically controlled line stretcher 602 that is placed in the transmitter path 116. The line stretcher 602 is either a zero or ¼ wavelength phase shift that is controlled by the frequency of a modulator 604. From FIG. 2, it can be seen that adding a ¼ wavelength to the system path length reverses the polarity of the signal on the output port of the mixer 112. If the output signal is stable at point 210, adding ¼ wavelength to the system path will move it to point 212 on the diagram. With a square wave modulation driving the line stretcher 602, the output of the mixer 112 will be a square wave of an amplitude twice the value of point 210 at the modulation frequency. On the other hand, if the output signal is stable at point 204, then adding ¼ wavelength to the system path will now move it to point 206 on the diagram. Since point 204 has a zero value, moving it to point 206 will also have a zero value.

The effect of the modulation is to move the signal information from dc up to the modulation frequency. Moving the information away from zero frequency reduces the interference from external sources such as fluorescent lamps, and reduces the phase noise of the microwave source. Moving the signal away from dc allows using ac instead of dc coupled components. The following are the trade off parameters for choosing the modulating frequency: (A) Most of the low frequency interfering signals are located below a couple hundred hertz (200 Hz); (B) The phase noise from most microwave sources decreases with increasing frequency, leveling off about 100 kilohertz (100 kHz) from the carrier; and (C) Above several hundred kilohertz the composite clutter signal starts to have a range related signature components making it difficult to get a good system null. Thus, the optimum radar line stretcher 602 modulation frequency lies somewhere in the range of several hundred hertz to about 100 kilohertz.

To eliminate the low frequency interference signals, it is desirable to move the balanced bridge radar target signal information away from zero frequency. A band pass filter at the modulation frequency with a large rejection of the low frequency interference signals is necessary. This filter can either be a hardware or software filter. The software approach seems to have the most merit.

Figure 7:
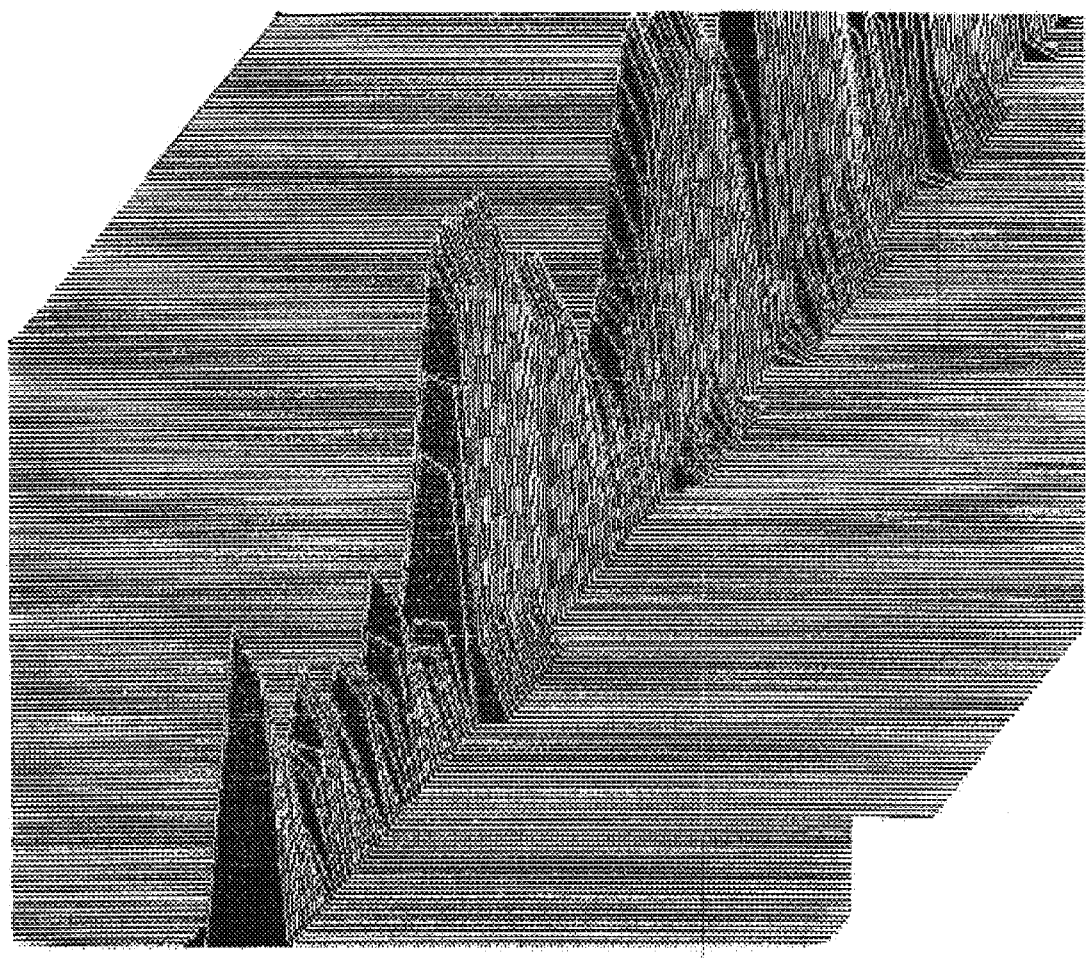
FIG. 7 illustrates a waterfall display of the output of the radar system in FIG. 6 when detecting targets.

A Fast Fourier Transform with a Waterfall Display of the radar signal is shown in FIG. 7. The figure shows the amplitude modulation of the radar signal by one or two small targets walking through the null points of the radar's antenna system. The time duration of FIG. 7 is approximately forty seconds (40 seconds). The balanced bridge radar was pointed at a mason jar approximately three feet (3 ft) in front of the radar. The mason jar contained approximately ten small targets (rice weevils), each three millimeters (3 mm) long.

Figure 8:
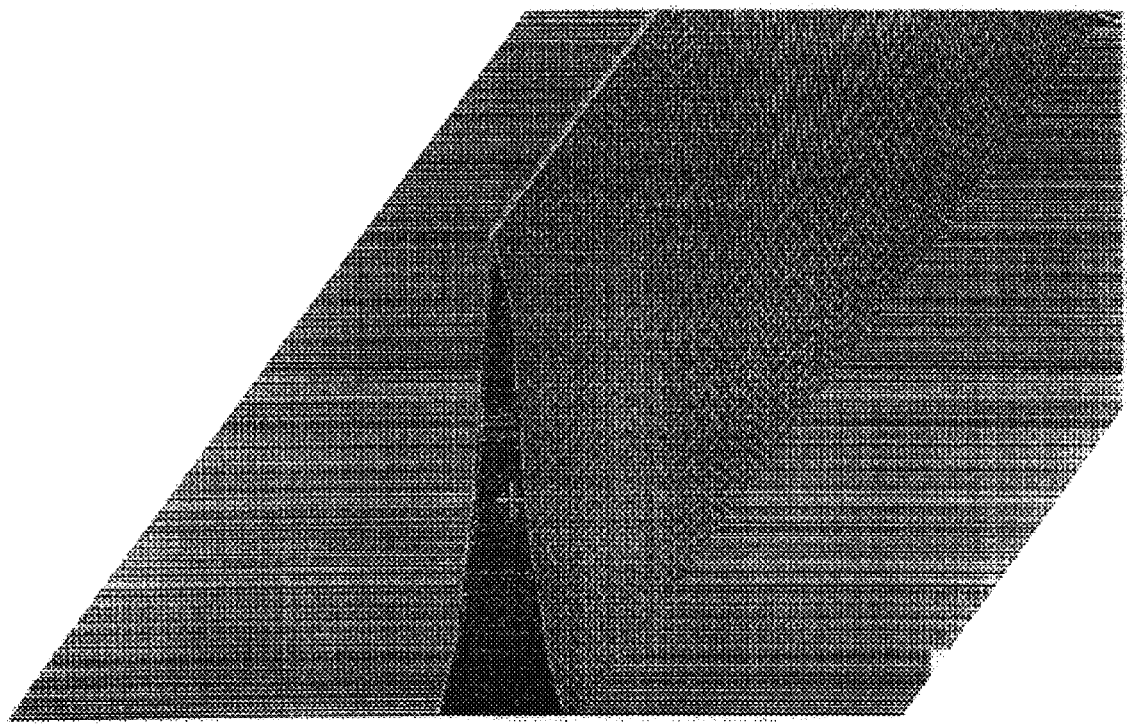
FIG. 8 illustrates a waterfall display of the output of the radar system in FIG. 6 in the absence of targets

FIG. 8 shows the output from the balanced bridge radar with the same mason jar setup and no small targets present. The waterfall display shows no amplitude modulation, indicating the absence of any rice weevils.

The above invention has been described primarily within the context of detecting insects. Broadly speaking, the invention is applicable to any moisture-bearing entity. For example, the balanced bridge radar can detect and quantize aerosol type targets. To verify this application, an experiment was performed in which aerosol clouds generated by a small air brush type spray gun were introduced into the balanced bridge radar's field of view. The average size of the aerosol cloud generated was approximately three feet (3') long by one foot (1') in diameter with droplets in the order of fifty (50) microns in diameter. It is noted that with greater radar sensitivity very small droplet sizes are detected. Using water as a testing liquid, a signature similar to that shown above with respect to FIG. 7 was obtained. Each time the spray was generated and introduced into the radar's field of view, a drop in amplitude of the waterfall display was observed. After a short time, the display returned to its original amplitude. Tests using a second liquid, Methyl Alcohol yielded similar results to the water test. A third liquid was tested, Trichlorofluoromethane (Refrigerant R-11), which also gave results similar to that obtained for water. These tests confirm that a wide variety of liquids in aerosol form provide a usable signal that is detected by the balanced bridge radar of the invention.

In another test, the radar was pointed vertically at a roof of a dwelling thirty feet (30') above the test platform and through a ceiling ten feet (10') above the floor. A light rain was causing a small amount of water to run down the roof. This movement of water was detected and measured using the balance bridge radar of the invention. Additionally, a small leak from a water pipe behind a concrete wall or below a concrete slab is also detectable and measurable using the invention.

In one testing scenario, a signal under a concrete floor slab was detected. The detected signal turned out to be a ground hog that had burrowed under an eight inch (8") thick concrete floor. The ground hog was about thirty feet (30') away from the testing area and provided a strong radar return signal. In general, in addition to detecting insects and aerosols as previously described, the invention is well adapted to the detection of small animals in walls, under floors or behind the foundations of buildings.

While the foregoing is directed to the preferred embodiment of the present invention, other and further embodiments of the invention may be devised without departing from the basic scope thereof, and the scope thereof is determined by the claims that follow.

What is claimed is:

1. Radar apparatus for detecting at least one small, slow moving target comprising:
    a radio frequency (RF) source having an RF signal as output;
    a phase shifter for producing a phase adjustment in a first portion of the RF signal, the phase adjustment chosen to initially cause a difference signal representing a position change of the at least one target to be substantially zero;
    an antenna arrangement for transmitting the phase adjusted RF signal to at least one target and receiving a reflection of the phase adjusted RE signal from at least one target; and
    a mixer for comparing a remainder of the RF signal with the reflection of the phase adjusted RF signal to produce the difference signal.

2. The apparatus of claim 1 wherein the phase shifter comprises a microwave line stretcher capable of continuously shifting the phase of an input signal from zero to at least ¼ of the wavelength of the input signal.

3. The apparatus of claim 1 wherein the antenna arrangement comprises a first antenna transmitting the phase adjusted RF signal and a second antenna for receiving the reflection of the phase adjusted RF signal.

4. The apparatus of claim 3 wherein the first and second antennae operate in the near field such that the distance from the first and second antennae to the at least one target is less than $2D^2/\lambda$, where D is the size of apertures of the first and second antenna and $\lambda$ is the wavelength of the RF signal.

5. The apparatus of claim 1 further comprising a direct current (DC) voltmeter for measuring the difference signal to produce a visual display of the position change of the at least one target.

6. The apparatus of claim 1 further comprising:
    a fast Fourier Transform (FFT) processor for band pass filtering the difference signal at the modulation frequency to reject interference signals; and
    a display means for displaying a waterfall display of the FFT filtered difference signal.

7. Radar apparatus for detecting at least one small, slow moving target comprising:
    a radio frequency (RF) source having an RF signal as output;

a first phase shifter for producing a phase adjustment in a first portion of the RF signal, the phase adjustment chosen to initially cause a difference signal representing a position change of the at least one target to be substantially zero;

a second phase shifter for modulating the phase of the phase adjusted RF signal at a modulation frequency;

a modulator for controlling the modulation frequency;

an antenna arrangement for transmitting the modulated phase adjusted RF signal to the at least one target and receiving a reflection of the modulated phase adjusted RF signal from the at least one target a mixer for comparing a remainder of the RF signal with the reflection of the modulated phase adjusted RF signal to produce the difference signal.

8. The apparatus of claim 7 wherein the first phase shifter comprises a microwave line stretcher capable of continuously shifting the phase of an input signal from zero to at least ¼ of the wavelength of the input signal.

9. The apparatus of claim 7 wherein the second phase shifter comprises an electronically controlled line stretcher capable of producing a discrete phase shift in an input signal that is quasi-stable between zero and ¼ of the wavelength of the input signal at the modulation frequency.

10. The apparatus of claim 9 wherein the modulation frequency is between approximately 200 Hz and 100 kHz.

11. The apparatus of claim 7 wherein the antenna arrangement comprises a first antenna transmitting the phase adjusted RF signal and a second antenna for receiving the reflection of the phase adjusted RF signal.

12. The apparatus of claim 11 wherein the first and second antennae operate in the near field such that the distance from the first and second antennae to the at least one target is less than $2D^2/\lambda$, where D is the size of apertures of the first and second antenna and $\lambda$ is the wavelength of the RF signal.

13. A method of radar detecting at least one small, slow moving target comprising:

(a) generating a radio frequency (RF) signal;

(b) producing a phase adjustment in a first portion of the RF signal, the phase adjustment chosen to initially cause a difference signal representing a position change of the at least one target to be substantially zero:

c) transmitting the phase adjusted RF signal to at least one target;

(d) receiving a reflection of the phase adjusted RF signal from at least one target; and (e) comparing a remainder of the RF signal with the reflection of the phase adjusted RF signal to produce the difference signal.

14. The method of claim 13 wherein the phase adjustment varies continuously from zero to at least ¼ of the wavelength of the RF signal.

15. The method of claim 13 further comprising, between steps (b) and (c), modulating the phase of the phase adjusted RF signal in accordance with a modulation frequency.

16. The method of claim 15 wherein the step of modulating the phase of the phase adjusted RF signal comprises producing a discrete phase shift in the phase adjusted RF signal that oscillates between zero and ¼ of the wavelength of the RF signal at the modulation frequency.

17. The method of claim 16 wherein the modulation frequency is between approximately 200 Hz and 10 kHz.

18. The method of claim 15 further comprising, after step (e), performing a fast Fourier Transform (FFT) process to band pass filter the difference signal at the modulation frequency to reject interference signals.

* * * * *